United States Patent Office 3,450,074
Patented June 17, 1969

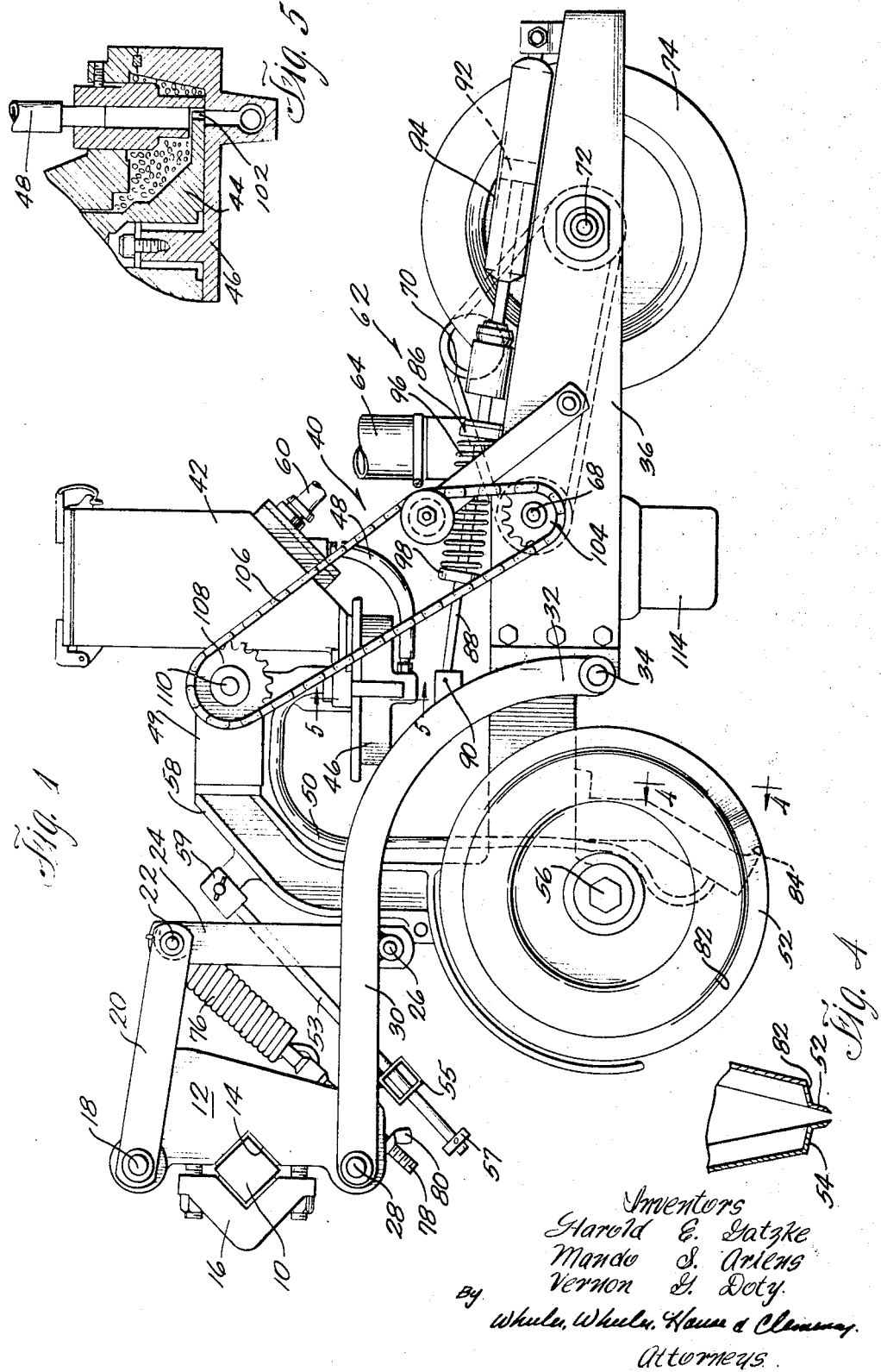

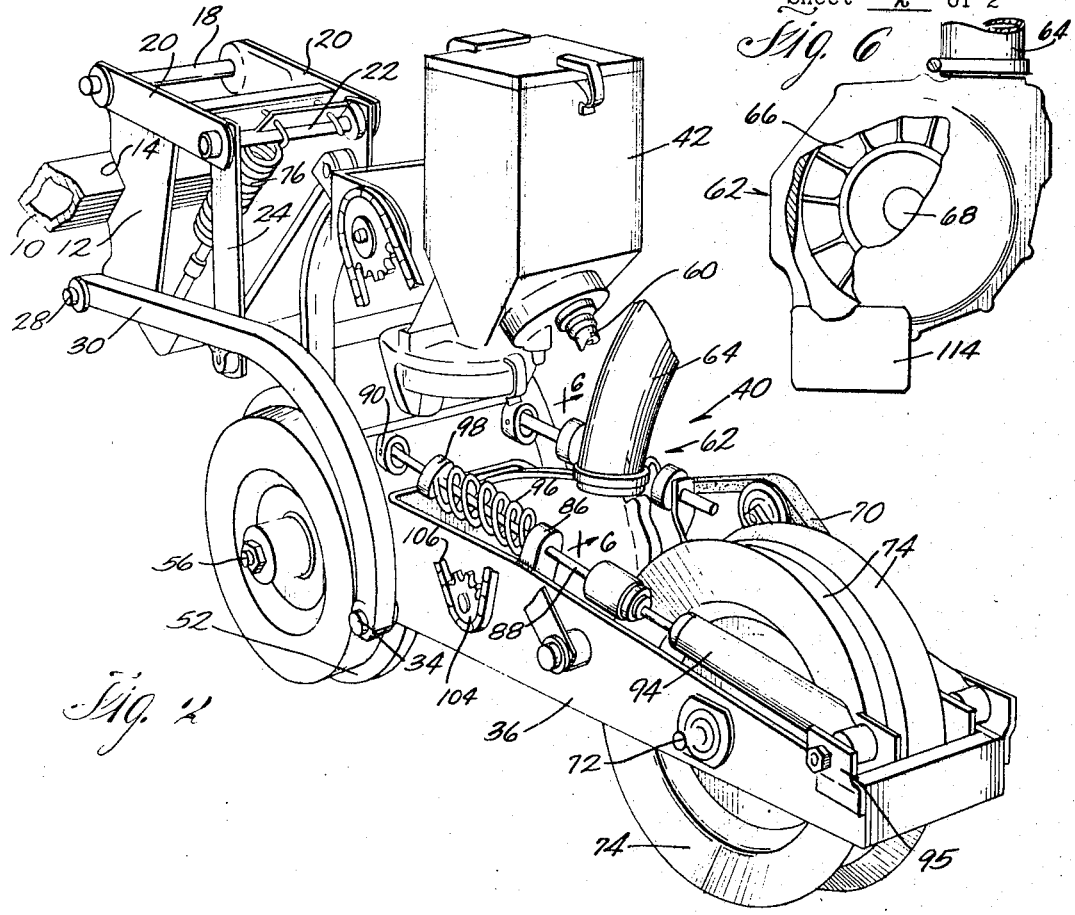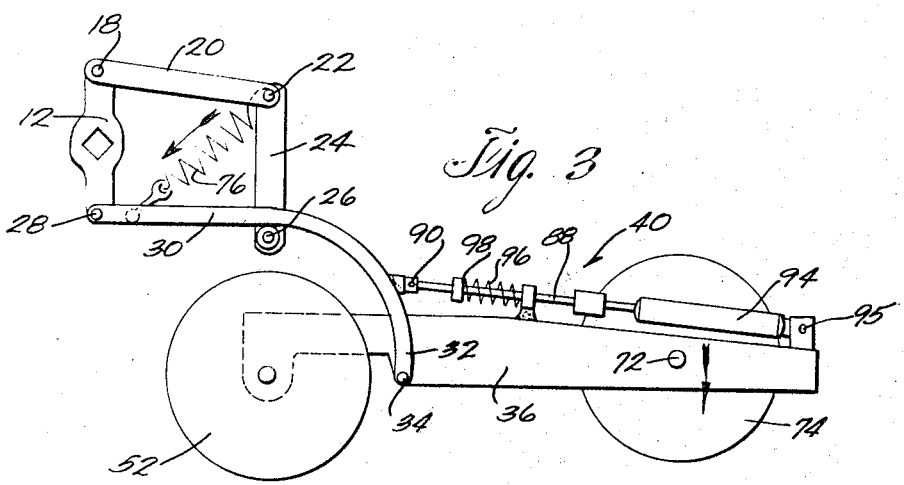

3,450,074
SEED PLANTER FOR DEPOSITING FINE SEEDS AT CONTROLLED DEPTH
Harold E. Gatzke, Berlin, Mando S. Ariens, West De Pere, and Vernon G. Doty, Brillion, Wis., assignors to Agri-Tek, Inc., Kaukauna, Wis., a corporation of Wisconsin
Filed Feb. 1, 1967, Ser. No. 613,256
Int. Cl. A01c 7/18, 5/04
U.S. Cl. 111—52                                    7 Claims

ABSTRACT OF THE DISCLOSURE

A planter provided with spring biased parallelogram linkage for regulating the total pressure on the earth is pivoted on a transverse axis intermediate its furrow-opening wheels and press wheels. Adjustable spring means apportions the total ground pressure between front and rear wheels, damping means being provided to oppose temporary displacement about said axis and thereby to maintain furrow depth uniform.

Summary of the invention

Uniformity of growth is very important, particularly when a crop is to be harvested mechanically. Such uniformity requires adjustments to compensate for wide variation in soil conditions, particularly when the seed is very fine.

Uniformity of planting is brought about in the instant device first by pivoting the planter unit on a transverse pivot intermediate its front and rear wheels; secondly, by control of over-all ground pressure; thirdly, by apportioning the over-all pressure between the front furrow-opening disk or wheel and the rear press wheel which firms the soil over the seed in the furrow; fourthly, by the use of anti-crustant which covers the seed immediately after planting; and, finally, by using a damping means which tends to hold the planter in its predetermined pressure-apportioning position, whereby to maintain uniform furrow depth when the furrow-opening disk encounters lumpy soil.

In accordance with the previous disclosure of a companion application Ser. No. 456,988, now Patent No. 3,322,080 entitled, "Method and Apparatus for Hydraulic Seed Metering and Planting," and filed May 19, 1965, the seed is mechanically metered under water after the seed has swelled by absorption of water which initiates germination. The absorption of water so softens the seed that mechanical metering would not be practicable without the immersion feature which so lubricates the seed as to make mechanical metering successful despite the softness of the seed.

Immediate shallow covering of the pre-soaked seed is done by depositing measured quantities of an anti-crustant agent immediately above the seed as soon as it has been delivered into the furrow. But for this feature, the lumpy or granular character of certain soils would prevent uniformity and might result in inhibiting or terminating the growth of a seed in which germination has already commenced. After the deposit of the anti-crustant material which at least covers the seed, the closing wheels of the planter can complete the covering operation without changing depth or damaging the seed. The anti-crustant intervenes between the deposited water and the covering ground, which might otherwise form a crust over the seed.

In order to apportion the total planter weight between the furrow-opening disk and the press wheel to meet various soil conditions, it is necessary to pivot the planter upon an intermediate transverse axis, subject to the action of biasing spring means. This pivotal arrangement would tend to cause the furrow-opening disk to ride over a lump encountered by it except for the fact that damping means resists any temporary oscillatory displacement of the planter about its transverse pivot. Thus the furrow-opening disk tends to cut through a lump rather than to ride over it. Similarly, the press wheel at the rear of the planter tends to crush a lump instead of riding over it. Even in lumpy soil this tends to keep the planted seed at a uniform depth. In seed as fine as lettuce seed or celery seed or onion seed, in which the cross section of the seed may be a sixty-fourth of an inch or less, it will be apparent that even with the utmost care, a variation of one-half inch in planting depth may represent a variation of approximately thirty times the diameter of the seed, or more. Since the depth may be a factor in the time of maturity and since uniformity of growth and maturity are desirable for the effective use of mechanical harvesting procedures, the matter of planting depth is a matter of great and hitherto inadequately appreciated significance.

Drawings

FIG. 1 is a view in side elevation of a planter embodying the invention, a portion of the towing vehicle being fragmentarily illustrated.

FIG. 2 is a view fragmentarily illustrating the planter in perspective, portions being broken away.

FIG. 3 is a view diagrammatically illustrating the means of biasing the entire planter downwardly and apportioning the biasing force between the furrow-opening means and the furrow-closing means.

FIG. 4 is a view taken in section on the line 4—4 of FIG. 1.

FIG. 5 is a view taken in section on the line 5—5 of FIG. 1.

FIG. 6 is a view taken in section on the line 6—6 of FIG. 2.

Description of invention

The invention consists in the combination of means for apportioning predetermined total planter pressure between the front and rear wheels (the furrow-opening disk and the press wheel) and at the same time stabilizing the positions of these wheels by damping displacement about the pivot upon which the weight is apportioned.

The planter will normally be moved by a towing vehicle. The vehicle is not illustrated in its entirety but there is shown at 10 a rockable tractor-mounted towing bar such as is conventionally carried on a three-point hitch of an agricultural tractor. In practice, the bar 10 is provided with means for controlling its position of oscillation upon its axis. It is usually approximately 18" above the ground and it is understood that incidental details are given by way of example and not by way of limitation.

The plates 12 have notches at 14 engaged with bar 10 and are held thereto by clamping member 16. The plates support a pintle rod 18 to which the forward ends of the arms 20 are pivoted as best shown in FIG. 2. The rearward ends of the arms 20 are cross connected by another pintle rod 22 upon which vertical links 24 are pivoted. The lower ends of links 24 are cross connected by pintle 26 and the plates 12 have a lower pintle rod 28. The elongated downwardly curved arms 30 have their forward ends pivoted on pintle 28 and have intermediate portions pivoted on pintle 26. The rear lower ends 32 of arms 30 are pivotally connected to pintles 34 on planter subframe 36, whereby an intermediate portion of planter subframe 36 is pivotally attached to the arms 30.

The planter, generally designated by reference character 40, includes a hopper 42 for seed and water. The metering valve 44 is rotatable in a housing 46 in water of hopper 42, being adapted to receive water and seed through a hose 48 and to discharge individual seeds with an increment of water through a hose 50 to a furrow opened in the ground. Furrow-opening disks 52 and 54 rotate on an axle 56 with which the planter frame 58 is provided forwardly of pintles 34. A rod 53 has limited sliding movement with bearing member 55 until the bearing member is engaged by a stop collar 57 on the lower end of rod 53. This limits the independent oscillation of the frame 58 with reference to the parallelogram arms 30. The extent of permissible oscillation is readily adjustable by adjusting rod 53 through the bearing member 59 and fixing its adjustment by the set screw shown in FIG. 1. The entire planter may be raised and lowered by pivoting the tractor-mounted rockable bar 10 upon its axis. Since the pivotal adjusting means is a conventional arrangement, it is not illustrated.

A bracket 49 supports the hopper 42 and the valve 46 and the motion transmitting connection by which the valve is rotated and which will hereinafter be described. Since the seeds to be planted may be minute and the water discharged with them may be substantial in quantity, a hose 60 is provided for replenishing the water in the hopper 42 from any suitable source (conveniently, a tank on the tractor).

Also mounted on the frame 36 of the planter 40 is an anti-crustant feeder 62 to which anti-crustant material is delivered through the pipe 64 from any appropriate source (not shown). The feeder includes a rotor 66 having motion transmitting connections driving it from the shaft 68, this being the same shaft which operates the seed metering device. This shaft is driven by any appropriate means such as the belt 70 from the axle 72 upon which the furrow-closing disks or wheels 74 are mounted. In accordance with conventional practice, these wheels are beveled to urge back into the furrow the earth which was displaced when the furrow was made.

For many soils, the net downward thrust of the planter may be approximately 100 pounds. The figure is given by way of example and not by way of limitation. If the weight of the planter exceeds the desired thrust, the planter may be partially supported by spring bias. If the weight of the planter is less than the desired thrust, additional pressure may be developed by spring bias. The spring which exerts its bias on the planter as a whole and predetermines total downward pressure on the soil is the spring 76 connected between the pintles 22 and 28. This spring may be connected directly with pintle 22. Its connection with pintle 28 is effected through a threaded rod 78 upon which a wing nut 80 is mounted to adjust the bias of the spring. Obviously, the arrangement will vary somewhat according to whether the spring is to function under compression or tension. Preferably, the spring structure is duplicated at both sides of the device. The bias of the springs or springs 76 is exerted diagonally across the parallelogram provided by the plates 12, the links 24, the upper arms 20, and the lower arms 30.

The reason the entire planter is floated on the pintle 34 at the lower ends of arms 30 is to enhance the accuracy of depth of planting of the seeds in the furrow opened by the disks 52 and 54. Depth-limiting shoulders such as that shown at 82 are known but will not of themselves assure uniformity of depth of planting of the seeds hydraulically conveyed through pipe 50 and discharged through the planting chute 84 into the furrow.

It has been found extremely important, therefore, to apportion the downward thrust of the planter, whether attributable to its weight or to the pull-down springs 76. Accordingly, the frame 36 of the planter is provided with a spring seat 86 through which the rod 88 is axially slidable. This rod is pivoted at 90 to the arm 30 at its forward end and at its rearward end it is connected to a piston 92 in a shock absorber cylinder 94 having a pivotal connection at 95 at the rear end of spring 86.

Encircling the rod forwardly of the spring seat 86 is a compresison spring 96 provided with a pressure controlling seat 98 which is fixed by a set screw to the rod 88 and is adjustable on the rod. Spring 96 is described as a transfer spring because of its function of transferring or apportioning downward pressure between the furrow-opening disks 52 and the press wheels 74. The structure shown may be duplicated at the righthand side of the frame, being illustrated only at the lefthand side. As will be recognized by those skilled in the art, the apportionment of downward pressure will also depend on the location of the transverse pintle between the front and rear wheels.

By virtue of the described organization, the apportionment of downward thrust of the entire planter, whether this be attributable to the weight of the planter, whatever its origin, can be varied as between the forward wheels 52 (the furrow-opening disks) and the rearward wheels 74 (the furrow-closing wheels) either by varying pintle location or by using adjustable spring biasing means.

By way of example and not by way of limitation, the total weight of the planter may be assumed to be approximately one hundred pounds. Of this weight (without supplement by spring bias) typically, sixty-two pounds may be imposed on the furrow-opening disks and thirty-eight pounds on the press wheels 74. In this particular embodiment, maximum spring pressure on the apportioning spring 96, and with no pressure on the pull-down springs 76, will reduce the pressure on the furrow-opening disk 52 to thirty-two pounds and increase the pressure on press wheels 74 to fifty-four pounds. With maximum tension on the pull-down springs 76 and maximum pressure on the apportioning or transfer spring 96, it is possible to exert ninety pounds pressure on each of the furrow-opening disks 52 and the furrow-closing disks 74. With maximum pressure on the pull-down spring and no compression on the apportioning spring 96, the downward pressure on the furrow-opening disks may be one hundred twenty pounds and the pressure on the press wheels seventy-two pounds.

As explained in our companion application Ser. No. 456,988, the seed is preferably soaked long enough to initiate germination prior to planting. This is practical because water is discharged with each seed and serves to provide the seed with an environment in the furrows which is favorable toward continued growth. The water performs another function in that it lubricates the seeds when they are being metered. The metering operation is mechanical and but for the fact that it is conducted under water, the seeds would be damaged in the process. In the arrangement shown, the water and the seeds reach the bottom of the metering chamber 46 and pass upwardly through the metering wheel 44. The carriage of this wheel will depend on the type of seed to be metered. It will usually have openings or slots 102 of such dimensions as to pass the seeds singly and to release such seeds under pressure of the water from tank 42 when the slot or opening registers with the discharge pipe 50 which leads to the planting nozzle 84. The rotor is turned by motion-transmitting connection of shaft 68 which, as above described, is driven from the wheel 74 at a rate which is therefore related to the rate of advance of the planter. As shown, the motion-transmitting connection includes sprocket 104, chain 106, sprocket 108, shaft 110 and the shaft 112 of the metering rotor 100.

The feeder 66 for anti-crustant is similarly operated and may discharge the anti-crustant material onto the seed in the furrow through a nozzle 114. According to the number and nature of pockets in the anti-crustant feeder 66, the material may be deposited in increments limited to cover the respective seeds, or, alternatively, the deposit may be substantially continuous along the entire furrow. The objective is not merely to cover the seed but to cover all portions of the earth along the furrow which may have been wet. It is desired not only to enhance uniformity of germination but to prevent the forming of crust which might resist the growth of the seedlings.

In operation, the planter frame is floated to exert control over all pressure upon the soil. In addition, the total of such pressure is apportioned between the furrow-opening disk and the furrow-closing wheel. The spring 96 accomplishes the apportionment but would be ineffective if the planter could oscillate freely upon its pintle 34. In order that the furrow may be of uniform depth, any abrupt pivotal displacement such as might be occasioned by lumps of soil in the path of the disk 52 are resisted by the shock absorber 94. Thus, regardless of lumps or irregularities in the surface traversed, there will be a very substantial increase in uniformity of planting depth as compared with functioning of planters previously known.

We claim:

1. In a planter having planting means carried on a subframe provided with at least one forward furrow-opening wheel and at least one aligned rear press wheel, said subframe having an arm for connecting it with a towing vehicle, the improvement which consists of a transverse pivotal connection between said arm and the subframe intermediate the furrow-opening wheel and the press wheel and upon which the subframe is bodily pivotally movable, and adjustable means for exerting bias on said subframe for effecting bodily movement thereof about said pivotal connection for apportioning between said wheels the downward pressure imposed thereon.

2. A planter according to claim 1 in further combination with damping means for opposing any abrupt pivotal movement of the subframe with respect to said arm.

3. A planter according to claim 1 in which the means for apportioning total downward pressure comprises a generally horizontal link member and a bearing member through which said link member is slidable, one of said members being in pivotal connection with said arm and the other with said subframe, said link and bearing member having spring seats and the link member being encircled by a spring confined between said seats.

4. A planter according to claim 3 in which said bearing member comprises a damping cylinder and said link carries a piston reciprocable in said cylinder.

5. A planter according to claim 1 in which the said planting mechanism comprises a metering rotor having positive driving connection with at least one of said wheels and a water chamber in which said rotor operates and which contains seed to be planted, said motor comprising means below water level in said chamber for metering a specific quantity of seed from the water of said chamber, said planter including means for delivering from said chamber and discharging into a furrow opened by a furrow-opening wheel a quantity of water with the seed so metered.

6. A planter according to claim 5 in further combination with means for discharging onto seed delivered into said furrow a predetermined quantity of anti-crustant for covering said seed and portions of said furrow wet by said water before the portions of the furrow into which said seed and water have been discharged are engaged by said press wheel.

7. A planter according to claim 1 in which said arm is provided at its forward end with parallelogram linkage having connection to a rockable tractor-mounted towing bar, said bar being adjustable for raising and lowering said planter.

References Cited

UNITED STATES PATENTS

| | | | |
|---|---|---|---|
| 2,496,885 | 2/1950 | Milton | 111—85 |
| 2,611,331 | 9/1952 | O'Neil | 111—85 X |
| 3,130,694 | 4/1964 | Gatzke | 111—7 |
| 3,261,127 | 7/1966 | Ferm et al. | 47—9 X |
| 3,322,080 | 5/1967 | Gatzke et al. | 111—1 |
| 3,351,031 | 11/1967 | Phillips et al. | 47—9 X |
| 3,362,361 | 1/1968 | Morrison | 111—85 X |

ANTONIO F. GUIDA, *Primary Examiner.*

ALAN E. KOPECKI, *Assistant Examiner.*

U.S. Cl. X.R.

111—7